US008543616B2

(12) United States Patent
Machiraju

(10) Patent No.: US 8,543,616 B2
(45) Date of Patent: Sep. 24, 2013

(54) APPLICATION CUSTOMIZABLE TO ENABLE ADMINISTRATORS OF LOYALTY PROGRAMS TO CONTROL COMMUNICATIONS TO MEMBERS

(75) Inventor: Rama Rao Pakasasana Machiraju, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 736 days.

(21) Appl. No.: 12/138,447

(22) Filed: Jun. 13, 2008

(65) Prior Publication Data

US 2009/0313197 A1    Dec. 17, 2009

(51) Int. Cl.
*G06F 17/30*    (2006.01)
*G06Q 30/00*    (2012.01)

(52) U.S. Cl.
USPC ........................................ 707/803; 705/14.18

(58) Field of Classification Search
None
See application file for complete search history.

(56) References Cited

U.S. PATENT DOCUMENTS

| | | | | |
|---|---|---|---|---|
| 2002/0046051 A1* | 4/2002 | Katzman et al. | ................... | 705/1 |
| 2002/0120600 A1* | 8/2002 | Schiavone et al. | ................. | 707/1 |
| 2002/0133474 A1* | 9/2002 | Fenton et al. | ................. | 705/500 |
| 2002/0188497 A1* | 12/2002 | Cerwin | ............................ | 705/10 |
| 2004/0019900 A1* | 1/2004 | Knightbridge et al. | ......... | 725/23 |
| 2004/0128198 A1* | 7/2004 | Register et al. | ................. | 705/14 |
| 2004/0236547 A1* | 11/2004 | Rappaport et al. | ................. | 703/2 |
| 2006/0047563 A1 | 3/2006 | Wardell | | |
| 2006/0235731 A1* | 10/2006 | Gupta et al. | ....................... | 705/4 |
| 2006/0253321 A1* | 11/2006 | Heywood | ......................... | 705/14 |
| 2006/0259361 A1* | 11/2006 | Barhydt et al. | .................. | 705/14 |
| 2007/0138268 A1* | 6/2007 | Tuchman | ........................ | 235/383 |
| 2008/0076534 A1* | 3/2008 | Iddings et al. | ................... | 463/25 |
| 2009/0018996 A1* | 1/2009 | Hunt et al. | ......................... | 707/2 |
| 2009/0094118 A1* | 4/2009 | Antonucci et al. | .............. | 705/14 |
| 2009/0325566 A1* | 12/2009 | Bell et al. | ....................... | 455/419 |

OTHER PUBLICATIONS

"Brian Gramer", "Rules Based Marketting", "http://www.crmproject.com/documents.asp? grID=383&d_ID=3796", Date: Mar. 2, 2006, pp. 1-3.
"Standard Register", "Marketing Automation", "http://www.standardregister.com/solutions/sol_marketingautomation.html", Copyright Date: 2008, pp. 1-3.
"AT&T", "Marketing Communications Platform", "http://www.corp.att.com/attlabs/docs/marketingcomm.pdf", Downloaded Circa: Jul. 31, 2008, pp. 1-2.
"Comarch Information Technology", "Comarch Loyalty Management", Copyright Date: 2007, pp. 1-12.

(Continued)

*Primary Examiner* — Tarek Chbouki
(74) *Attorney, Agent, or Firm* — Narendra Reddy Thappeta

(57) ABSTRACT

Application customizable to enable administrators of various reward/loyalty programs to control communications to members. In one embodiment, an administrator is enabled to configure various rules corresponding to an event with the application of the rules to a member information identifying which ones of multiple contents is to be sent to which of the members using which one of different channels. The rules are then stored in a non-volatile memory. On identifying the occurrence of the event, the rules, and the member information are examined to determine that a first and a second content are to be sent respectively to a first and a second member using a first and second channel. Accordingly, the first content is sent to the first member using the first channel and the second content is sent to the second member using the second channel.

13 Claims, 13 Drawing Sheets

(56) References Cited

OTHER PUBLICATIONS

"Kana", "Kana Connect", "http://www.kana.com/portlets/59/KANAConnect%20ds_11_06.pdf", Copyright Date: 2006, pp. 1-2.

"Neolane", "Neolane-Frictionless Marketting", "http://www.neolane.com/us1/marketing_software/campaign_automation.htm", Copyright Date: 2001-2008, pp. 1-2.

* cited by examiner

| | 301 | 302 | 303 | 304 | 305 | 306 | 310 |
|---|---|---|---|---|---|---|---|
| | RowId | Identifier | Criteria Name | Rule Start Date | Rule End Date | Criteria Type | Conditions |
| 311 → | 600001 | R1 | Primary Member Rule - Enrollment | | | Member | Member's Age >=18 Years |
| 312 → | 600002 | R2 | Member Recipient Rule - Enrollment | | | Member | Member's Age < 18 Years |
| 313 → | 600003 | R3 | Email Channel Rule - Enrollment | | | Channel | |
| 314 → | 600004 | R4 | Print Channel Rule - Enrollment | | | Channel | Member's Country of residence = "USA" And Member Class = "Primary Member" |
| 315 → | 600005 | R5 | Welcome Letter - Primary Member - US Residents | | | Document Type | Member's Country of residence = "USA" AND Member's Age >=18 Years |
| 316 → | 600006 | R6 | Welcome Letter - Primary Member - Non- US Residents | | | Document Type | Member's Country of residence NOT Equals "USA" AND Member's Age >=18 Years AND Channel= 'Email' |
| 317 → | 600007 | R7 | Enrollment Kit - Primary Member | | | Document Type | Member's Status = 'Active' |
| 318 → | 600008 | R8 | Welcome Letter - Member Relationship | | | Document Type | Member's Age < 18 Years AND Channel = 'Email' |
| 319 → | 600009 | R9 | Member Recipient Rule - Internal Contact | | | Member | New Tier = 'Gold' OR New Tier = 'Platinum' |
| 320 → | 600010 | R10 | Tier Change Notification - Internal Contact | | | Document Type | New Tier = 'Gold' OR New Tier = 'Platinum' |

| RowId | Event Identifier | Event Name | Event Start Date | Event End Date |
|---|---|---|---|---|
| 6600001 | E10001 | Assessment | | |
| 6600002 | E10002 | Enrollment | | |
| 6600003 | E10003 | Redemption Voucher | | |
| 660004 | E10004 | Loyalty Units Purchase | | |
| 660004 | E10005 | Statement request | | |

331 — RowId
332 — Event Identifier
333 — Event Name
334 — Event Start Date
335 — Event End Date 321, 322, 323, 324, 325

FIG. 3C

| RowId | Class Identifier | Member Class |
|---|---|---|
| 6600001 | C001 | Primary Member |
| 6600002 | C002 | Member Relationship |
| 6600003 | C003 | Internal Contact |
| 660004 | C004 | Recipient Member |

361 — RowId
362 — Class Identifier
363 — Member Class 351, 352, 353, 354

FIG. 3D

| RowId | Document Identifier | Template Description | Template Location |
|---|---|---|---|
| 640000 | D1 | Welcome Letter - Primary Member - US Residents | file:://templates/us/welcome.wpd |
| 640001 | D2 | Welcome Letter - Primary Member - Non- US Residents | file:://templates/nonus/welcome.wpd |
| 640002 | D3 | Enrollment Kit - Primary Member | file:://templates/all/enroll.zip |
| 640003 | D4 | Welcome Letter - Member Relationship | file:://templates/all/relation.wpd |
| 640004 | D5 | Member Tier Change Notification | file:://templates/all/tierchange.doc |
| 640005 | D6 | Gold-Platinum Congratulatory Note | file:://templates/all/AuPtNote.doc |

| RowId | Channel Name | Channel Start Date | Channel End Date |
|---|---|---|---|
| 6500001 | E-mail | | |
| 6500002 | Ground Mail | | |
| 6500003 | Fax | | |
| 6500004 | Voice Mail | | |
| 6500005 | SMS Message | | |

381, 382, 383, 384
385, 386, 387, 388, 389

| | RowId (521) | Event Identifier (522) | Member Class (523) | Channel (524) | Document Type (525) | Member Relation Ship Type (526) | Description (527) | Criteria (528) | Flag Default Channel (529) |
|---|---|---|---|---|---|---|---|---|---|
| 530 → | 520001 | E10002 | Primary Member | | | | Primary Member Rule - Enrollment | R1 | |
| 531 → | 520002 | E10002 | Member Relationship | | | Father | Member Recipient Rule - Enrollment | R2 | |
| 532 → | 520003 | E10002 | | E-Mail | | | Email Channel Rule - Enrollment | R3 | Y |
| 533 → | 520004 | E10002 | | Print | | | Print Channel Rule - Enrollment | R4 | |
| 534 → | 520005 | E10002 | | | D1 | | Welcome Letter - Primary Member - US Residents | R5 | |
| 535 → | 520006 | E10002 | | | D2 | | Welcome Letter - Primary Member - Non-US Residents | R6 | |
| 536 → | 520007 | E10002 | | | D3 | | Enrollment Kit - Primary Member | R7 | |
| 537 → | 520008 | E10002 | | | D4 | | Welcome Letter - Member Relationship | R8 | |

*FIG. 5*

| | 621 | 622 | 623 | 624 | 625 | 626 | 627 | 628 | 629 | 630 |
|---|---|---|---|---|---|---|---|---|---|---|
| | RowId | Member Identifier | Member Relationship Identifier | Member Name | Member Class | Member Relationship Type | Address | Country | DOB | Member Status |
| 651 → | 7200001 | M0001 | | Joseph Ben | Primary Member | | 1600 Pennsylvania Avenue NW Washington, DC 20500 | USA | 17-Jan-1963 | Active |
| 652 → | 7200002 | M0002 | M0008 | Vijay Sharma | Internal Contact | | Infodesk, Bangalore | India | 25-Sep-1954 | Active |
| 653 → | 7200003 | M0003 | | Stanley Smith | Primary Member | | 330 Bob Hope Dr Burbank, CA 91523 | USA | 1-Dec-1993 | Active |
| 654 → | 7200004 | M0004 | M0003 | Terry Smith | Member Relationship | Father | 330 Bob Hope Dr Burbank, CA 91523 | USA | 30-Apr-1966 | Active |
| 655 → | 7200004 | M0005 | M0003 | Mary Smith | Member Relationship | Mother | 330 Bob Hope Dr Burbank, CA 91523 | USA | 15-Aug-1968 | Active |
| 656 → | 7200004 | M0006 | | William Grant | Primary Member | | 10, Downing Street, Westminister, London | UK | 22-July-1985 | Active |
| 657 → | 7200004 | M0007 | M0006 | Gabriel Grant | Member Relationship | Spouse | 10, Downing Street, Westminister, London | UK | 14-Jun-1988 | Active |
| 658 → | 7200004 | M0008 | | ABC Pvt Ltd | Primary Member | | 7, Gulmohar Enclave, Marathahalli, Bangalore | India | 5-Jan-1974 | Active |

*FIG. 6A*

| RowId | Member Identifier | Event Identifier | Start Date | End Date | Communication Status |
|---|---|---|---|---|---|
| 800001 | M0001 | E10002 | | | Pending |
| 800002 | M0003 | E10002 | | | Pending |
| 800003 | M0007 | E10008 | | | Pending |

APPLICATION CUSTOMIZABLE TO ENABLE ADMINISTRATORS OF LOYALTY PROGRAMS TO CONTROL COMMUNICATIONS TO MEMBERS

BACKGROUND

1. Technical Field

The present disclosure relates generally to Customer Relationship Management (CRM) applications and more specifically to an application customizable to enable administrators of various reward/loyalty programs to control communications to members.

2. Related Art

Loyalty programs are generally designed to facilitate organizations to reward and retain their customers/members. For example, an airlines organization may have a frequent flier program in which travelers are rewarded with free tickets, vacation packages, reduced subscription prices for magazines, etc., usually depending on the number of miles flown. Similarly, a retail chain of stores may have loyalty programs targeted to (frequent) purchasers of products. Organizations usually award loyalty units (e.g., frequent flier miles, dollars spent, etc.), which can then be redeemed for various rewards.

There is a general need for organizations to send communications to members. The communication sent to members may depend on specific event(s) (occurrence of a desired business situation, typically defined by occurrence of a state) triggering the communication. For example, when a customer/member enrolls, it may be desirable to provide a general brochure with relevant information. On the other hand, when a member exceeds certain level of purchases (e.g., number of miles traveled) communication may need to be sent indicating upgrade to a higher class.

Software applications are often used to administer (including sending communications) loyalty programs. The software applications are often termed as CRM applications since relationship is being managed with the members. The software applications generally need to provide for the communications noted above.

It is often desirable that administrators of applications of specific loyalty programs be able to control the specific communications sent to specific members. For example, different business types (e.g., airline versus a grocery store) may have different criteria for rewards. Similarly, different organizations within the same business type may have different rewards and/or criteria.

Thus, depending on the specific organization for which the application is being deployed, it may be desirable to provide the corresponding administrator the ability to control communications to members. Such a need is of particular relevance in case of vendors of the software applications, who may wish to sell (including license, etc.) the same software to several organizations tailored for their corresponding environment (airlines, retail, etc.), while simplifying individual customizations.

BRIEF DESCRIPTION OF THE DRAWINGS

Example embodiments of the present invention are described with reference to the accompanying drawings briefly described below.

FIGS. 3A-3E together illustrates some of the data that may be setup to simplify the administrator task of specifying rules, in one embodiment.

FIG. 5 depicts a portion of configuration data in tables contained in configuration storage 160 in one embodiment.

FIG. 6A depicts a portion of data representing various members of a loyalty program in one embodiment.

FIG. 6B depicts a portion of data representing various members satisfying the business situation underlying the corresponding specific events and the status of communication in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
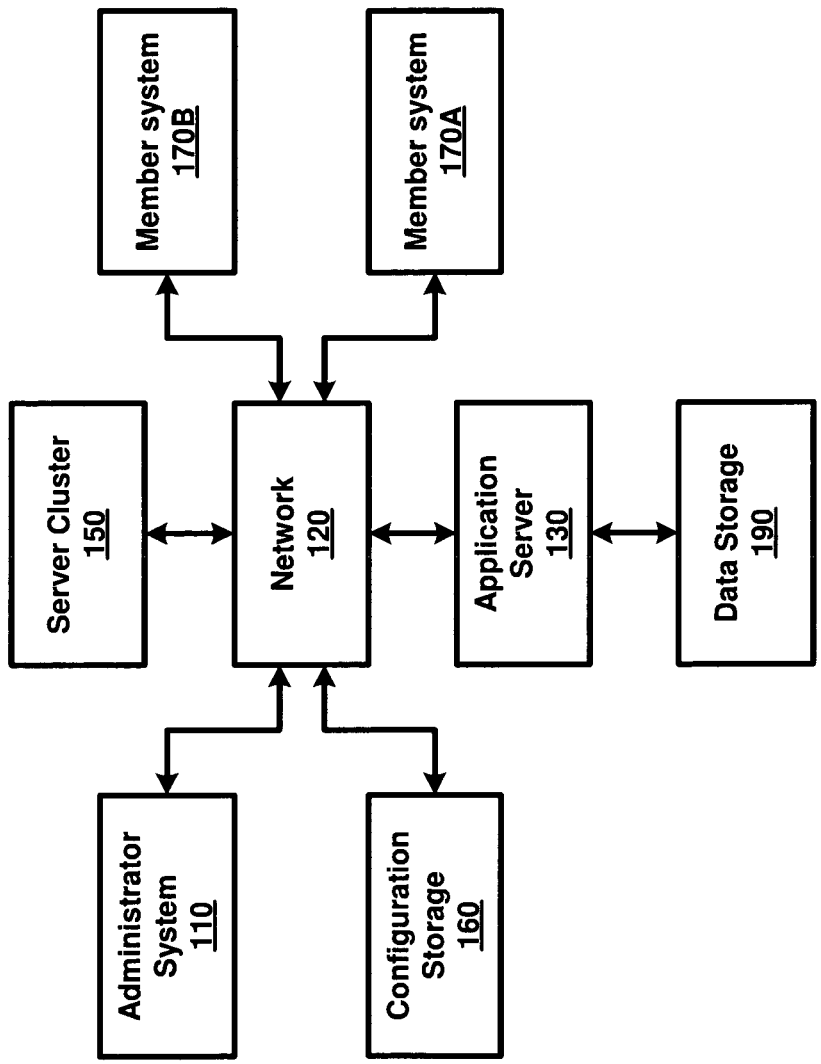
FIG. 1 is a block diagram illustrating an example environment (computing system) in which several aspects of the present invention can be implemented.

An aspect of the present invention provides for controlling communications to different members of a loyalty program. In one embodiment, an administrator is enabled to configure various rules corresponding to an event with the application of the rules to a member information (containing the details of each member) identifying which ones of multiple contents is to be sent to which of the members. The rules are then stored in a in a non-volatile memory.

On identifying the occurrence of the event, the rules, and the member information are examined to determine that a first and a second content are to be sent respectively to a first and a second member. The first content is then sent to the first member and the second content is sent to the second member.

In one embodiment, the rules (configured by the administrator) further identify which ones of different channels are to be used for sending the content. Thus, in the above aspect, it may be determined that a first and a second channels are to be used for sending the respective content to the respective members. Accordingly, the first content is sent to the first member using the first channel and the second content is sent to the second member using the second channel.

Another aspect of the present invention enables a third and fourth rule to be associated with a third member, where the fourth rule indicates that communication is to be sent to a fourth member when an event is identified occurring in relation to the third member, and the member information specifies that the third member is related to the fourth member. Accordingly, a fourth content is sent to the fourth member if the event is identified occurring in relation to the third member.

In one embodiment, the fourth rule indicates that the fourth member is to be sent communication only upon the member information corresponding to the third member satisfying a condition. In one scenario, the fourth member is a parent and the third member is a child of the parent, and the condition includes checking the age of the child (third member). In another scenario, the fourth member is a contact person in a business entity associated with the loyalty program and the condition includes a change of level of the third member based on the number of loyalty units accumulated by the third member in a period.

One more aspect of the present invention enables the rules to be specified as a first set of rules which determines the specific members to whom the communication is to be sent, a second set of rules which determines a corresponding contents to be sent to each of the specific members, and a third set of rules which determines a corresponding channel to be used for sending the corresponding contents to each of the specific members.

In one embodiment, each of the first set of rules contains a corresponding first condition with the specific members being identified as the members whose respective member information satisfies the corresponding first condition of any one of the first set of rules. Similarly, each of the second set of rules contains a corresponding second condition with the specific contents to be sent to a specific member being determined based on whether the member information of the specific member satisfies the corresponding second condition of any one of the second set of rules.

Further, each of the third set of rules contains a corresponding third condition, with the specific channel to be used corresponding to the specific member being determined based on whether the member information of the specific member satisfies the corresponding third condition of one of the third set of rules. In a scenario that the member information of the specific member does not satisfy the corresponding third condition of all of the third set of rules, a default channel (indicated by the administrator) is determined to the be the specific channel of communication.

Accordingly, a combination of a member, content, and channel is determined consistent with the first, second and third set of rules such that the corresponding contents is sent to each of the specific members on a corresponding specific channel. In one embodiment, the second condition for one of the second set of rules is based on a type of channel, and the third condition for one of the third set of rules is based on a type of content.

Several aspects of the invention are described below with reference to examples for illustration. It should be understood that numerous specific details, relationships, and methods are set forth to provide a full understanding of the invention. For example, many of the functions units described in this specification have been labeled as modules/blocks in order to more particularly emphasize their implementation independence.

A module/block may be implemented as a hardware circuit containing custom very large scale integration circuits or gate arrays, off-the-shelf semiconductors such as logic chips, transistors or other discrete components. A module/block may also be implemented in programmable hardware devices such as field programmable gate arrays, programmable array logic, programmable logic devices, or the like.

Module/blocks may also be implemented in software for execution by various types of processors. An identified module of executable code may, for instance, contain one or more physical or logical blocks of computer instructions which may, for instance, be organized as an object, procedure, or function. Nevertheless, the executables of an identified module need not be physically located together, but may contain disparate instructions stored in different locations which when joined logically together constitute the module/block and achieve the stated purpose for the module/block.

It may be appreciated that a module/block of executable code could be a single instruction, or many instructions and may even be distributed over several code segments, among different programs, and across several memory devices. Further, the functionality described with reference to a single module/block can be split across multiple modules/blocks or alternatively the functionality described with respect to multiple modules/blocks can be combined into a single (or other combination of blocks) as will be apparent to a skilled practitioner based on the disclosure provided herein.

Similarly, operational data may be identified and illustrated herein within modules and may be embodied in any suitable form and organized within any suitable type of data structure. The operational data may be collected as a single data set, or may be distributed over different locations including over different member disks, and may exist, at least partially, merely as electronic signals on a system or network.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the following description, numerous specific details are provided such as examples of programming, software modules, user selections, network transactions, database queries, database structures, hardware modules, hardware circuits, hardware chips, etc., to provide a thorough understanding of embodiments of the invention.

However one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing administrator system 110, network 120, server cluster 150, application server 130, configuration storage 160, member systems 170A-170B, and data storage 190.

Merely for illustration, only representative number/type of systems is shown in the Figure. Many environments often contain many more systems, both in number and type, depending on the purpose for which the environment is designed. Each block of FIG. 1 is described below in further detail.

Network 120 provides connectivity between administrator system 110, server cluster 150, application server 130, and member systems 170A-170B. Network 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Each of member systems 170A-170B represents a system (e.g., a personal computer, workstation, mobile station/device, etc.) accessed by the members of the loyalty programs. Members may access communications received in any electronic form (example: e-mail) on any loyalty program via network 180 by executing corresponding application (example: e-mail application or browser) in member systems 170A-170B. Member systems 170A-170B is generally physically located at the corresponding member location (e.g., home). For illustration and for convenience, member systems 170A-170B is shown connected to network 120.

Each of data storage 190 and configuration storage 160 represents a non-volatile storage facilitating storage and retrieval of a collection of data. In one embodiment, data storage 190 and configuration storage 160 are implemented using relational database technologies and therefore provide storage and retrieval of data using structured queries such as SQL (Structured Query Language). SQL refers to a special-purpose, nonprocedural language that supports the definition, manipulation, and control of data in systems implementing relational database technologies.

In one embodiment, data storage 190 stores data representing member information, which are accessed by both the loyalty application executing on application sever 130 and the application framework executing on server cluster 150. Configuration storage 160 stores various rules that can be configured by an administrator as well as the configured rules, which enable control of communications to members of various loyalty programs.

Application server 130 represents a server, which executes instructions corresponding to loyalty applications. A loyalty application may provide for features such as keeping track of member information (e.g., miles/trip flown in case of airlines, name/address of the member), redeeming the rewards, enabling members to check their account status, update their profile information (age, name, relationships, preferences, address), etc., all of which may be stored in data storage 190.

Administrator system 110, in combination with server cluster 150, enables an administrator of loyalty programs to control communications to members according to several aspects of the present invention. In one embodiment, administrator system 110 provides a suitable interface using which an administrator may configure various rules to control such communication, while server cluster 150 provides the corresponding logic, as described below in further detail.

Server cluster 150 represents one or more servers, which together execute instructions corresponding to an application framework to facilitate an administrator of a loyalty program to control communications to members. The application framework can be integrated into the loyalty application in alternative embodiments. Each of application server 130 and server cluster 150 may also contain other software programs such as operating system, device drivers, etc., (not shown) that provides a (common) run time environment facilitating the execution of corresponding applications and frameworks.

According to an aspect of the present invention, the application framework enables the same application software to be easily tailored/customized by different administrators for their corresponding environments, as described below in further detail. The application framework executing on server cluster 150 enables administrators of various loyalty programs to control communication to members of each corresponding loyalty program as described below with examples.

3. Controlling Communications to Members

Figure 2:
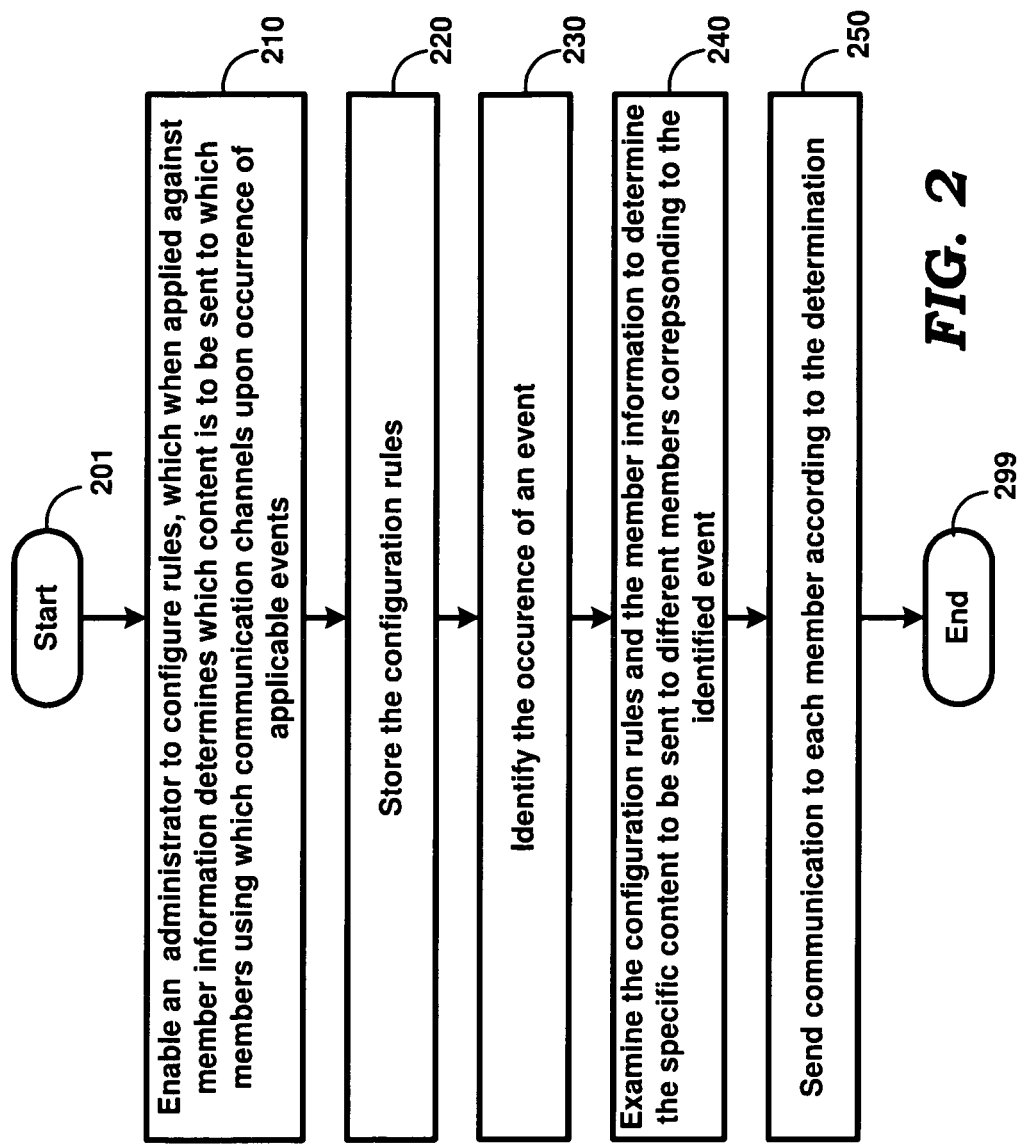
FIG. 2 is a flowchart illustrating the manner in which communication to members of various loyalty programs (and other recipients) can be controlled according to an aspect of the present invention.

FIG. 2 is a flowchart illustrating the manner in which communication to members of various loyalty programs (and other recipients) can be controlled according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, server cluster 150 enables an administrator to configure rules, which when applied against member information determines which content is to be sent to which members using which communication channel upon occurrence of applicable events. As noted above, an event refers to occurrence of a desired business situation, typically satisfying a desired state(s). The state can be accumulation (or absence thereof) of a desired number of loyalty units, specific seasons/festivals of a year, member's birthday, etc.

Data representing the configuration rules may be specified by a user/administrator using administrator system 110. For example, administrator system 110 may display a user interface according to the application framework executing on server system 150 and may use/access data contained in data storage 190 which is also accessed by the loyalty application executing in application server 130.

It may be appreciated that the rules may be configured to determine other recipients (who are non-members) such as member relationships, internal contacts of a company offering the loyalty program, etc as described below with examples. Further, the configured rules when applied against member information may determine more than one member/recipient to whom communication is to be sent, a corresponding content which is to be sent, and a corresponding communication channel to be used.

In step 220, server cluster 150 stores the configuration rules. The configuration rules are stored externally in a database represented by configuration storage 160. Alternatively or in addition, configuration rules may be stored in an internal storage contained in any of server cluster 150 or application server 130.

In step 230, server cluster 150 identifies the occurrence of an event for which corresponding rules have been configured by the administrator. The identification may be performed based on the data maintained in data storage 190 by a loyalty application and/or based on inputs provided by the administrator.

In step 240, server cluster 150 examines the configuration rules stored in configuration storage 160 and the member information maintained in data storage 190 to determine the specific communication content to be sent to different members of loyalty programs for the identified event. In general, various parameter values associated with the member information is compared with the conditions associated with the criteria in the configured rules to determine the specific content to be sent to specific members on specific communication channels.

In step 250, communication to each member of a loyalty program is sent according to the determination (in step 240). Server cluster 150 may send (or facilitate sending, for example, in case of print communications) the communication according to such a determination or may indicate to application server 130 to send the communication.

Thus, based on configuration of rules provided by an administrator, server cluster 150 determines content to be sent, the specific recipients for each content, and mode of communication upon occurrence of applicable events. Accordingly, the administrator may conveniently control communications to various members of loyalty programs.

It may be observed that communications are controlled based on the configuration rules. As noted above, the manner in which a software application can be tailored/customized is simplified according to an aspect of the present invention. The simplification can be appreciated based on a corresponding user experience (as experienced by an administrator) during configuration. However, the user experience may require certain prior setup and accordingly the description is continued with an illustration of sample setup data.

4. Data Setup

FIGS. 3A-3E together illustrates some of the data that may be setup to simplify the administrator task of specifying rules, in one embodiment. The setup data may be specified by an administrator/user using administration system 110. The administrator may specify different setup data according to the specific organization and/or business type offering the loyalty program.

FIGS. 3A-3E respectively represents a portion of data corresponding to various criteria, channels of communication, events supported by loyalty programs and members of various events in one embodiment. Each of FIGS. 3A-3E represents a database table containing corresponding data.

Table of FIG. 3A (also referred to as "table 3A") depicts a portion of data representing definition of various criteria in one embodiment. The table is shown containing rows 311-320 and columns 301-306 and 310, the description of which will be clear at least based on the below explanation. Each criterion has corresponding conditions, which can be used for comparison with any data, though the examples there are shown with respect to member information. Each of the columns of table 3A is described briefly below.

Column 301 "ROWID" specifies an identifier, which uniquely identifies each row in table 3A. Columns 302 "Criteria" and 303 "Criteria Name" respectively specifies the identifier (used by administrators during configuration) and name (convenient label) of the criteria. The values in columns 302 and 303 correspond to the values of identifiers for the criteria (302) and the name of the criteria (303).

Columns 304 and 305 respectively indicate the start date and the end date, between which the corresponding criteria are applicable. Column 306 "Criteria Type" specifies the type of each criterion as being one of member/channel/content (document type). Though each criterion is shown associated with a single criteria type, it should be appreciated that multiple types can also be associated with each criterion/row. Column 310 "Conditions" specify the conditions associated with each criterion (with a blank value indicating the absence of conditions as shown in row 313, which represents the default value for the criterion).

Thus, row 311 corresponds to a criterion identified by identifier R1, which is applicable in any duration (due to absence of dates indicated in the corresponding entry), the rule being applicable only to constrain members, and the condition (age greater than 18) to be used in such constraining. Though a single condition is shown, multiple conditions can be associated with each row. The remaining rows are similarly described. It is sufficient to note that certain rules are applicable for constraining the corresponding ones of members/communication channels and content (i.e., documents), though alternative embodiments can include other criteria types (such as events) as well.

Table 3B shows the various events based on which communications may be setup in one embodiment. The table of FIG. 3B is shown containing rows 321-325 and columns 331-335. The table indicates that there are five possible events, tier assessment (to determine whether a member is eligible to be moved from one tier to another, for example, based on the number of loyalty points accumulated during a period), enrollment (when a member signs up for a loyalty program), redemption voucher (when a voucher is requested for a product/service to redeem loyalty units accumulated), loyalty units purchase (when the units are purchased, for example, for cash) and statement request (when the status of the number of loyalty units accumulated and/or transactions is requested by the customer). The event identifier is used to uniquely identify each event, and is used in other tables, as described below.

The description is continued with an illustration of how content of communication can be controlled by maintaining various document types with each document type containing corresponding content.

FIG. 3C depicts information setup indicating the various member classes in one embodiment. The table is shown containing columns 361, 362 and 363, and rows 351-354. Each row indicates a corresponding row identifier, class identifier, and member class. Thus, the illustrative example is assumed to have only four member class primary member (usually the customer/member), member relationship (e.g., employee, spouse, children), internal contact (usually applicable only to businesses), and recipient member (in case of businesses, the specific person to whom communications may be directed).

FIG. 3D depicts information setup indicating various communication contents that can be sent to different members in one embodiment. The table there is shown with columns 371-374 and rows 375-380. Column 371 "ROWID" specifies an identifier, which uniquely identifies each row in table 3D. Column 372 "Document identifier" and 373 "Template Description" specify the identifier and (user understandable) description of what the document contains. Template location identifies the file directory and name, which contains the content that can be customized for each recipient.

Each row indicates one communication content. Thus, row 375 having a row identifier 64000, has a unique document identifier D1, has a template description of "Welcome Letter-Primary Member-US Residents", and the file location is "file::/templates/us/welcome.wpd". The remaining rows are similarly described.

FIG. 3E depicts the various channels of communication supported by the loyalty application in one embodiment. The table is shown containing rows 385-389 and columns 381-

384. Column 381 "ROWID" specifies an identifier, which uniquely identifies each row in table 3E. Column 382 "Channel Name" specifies the name of a channel. Values in column 382 correspond to the values of name of the channel.

Columns 383 "Channel Start Date" and 384 "Channel End date" specify the start and end date during which the channel is available for sending communications. A blank value indicates that the channel of communication is always accessible to loyalty application. Non-blank values may be used, for example, on specific occasions (e.g., to send cards in Christmas season).

The data in rows 385-389 respectively indicates that Email, Ground Mail, Fax, Voice Mail, and SMS messages are possible communication channels to send communications.

The description is continued with an illustration of a user interface provided by the application framework for an administrator to configure rules for various events based on the information setup above, in an example embodiment.

5. Configuration of Events

Figure 4A:
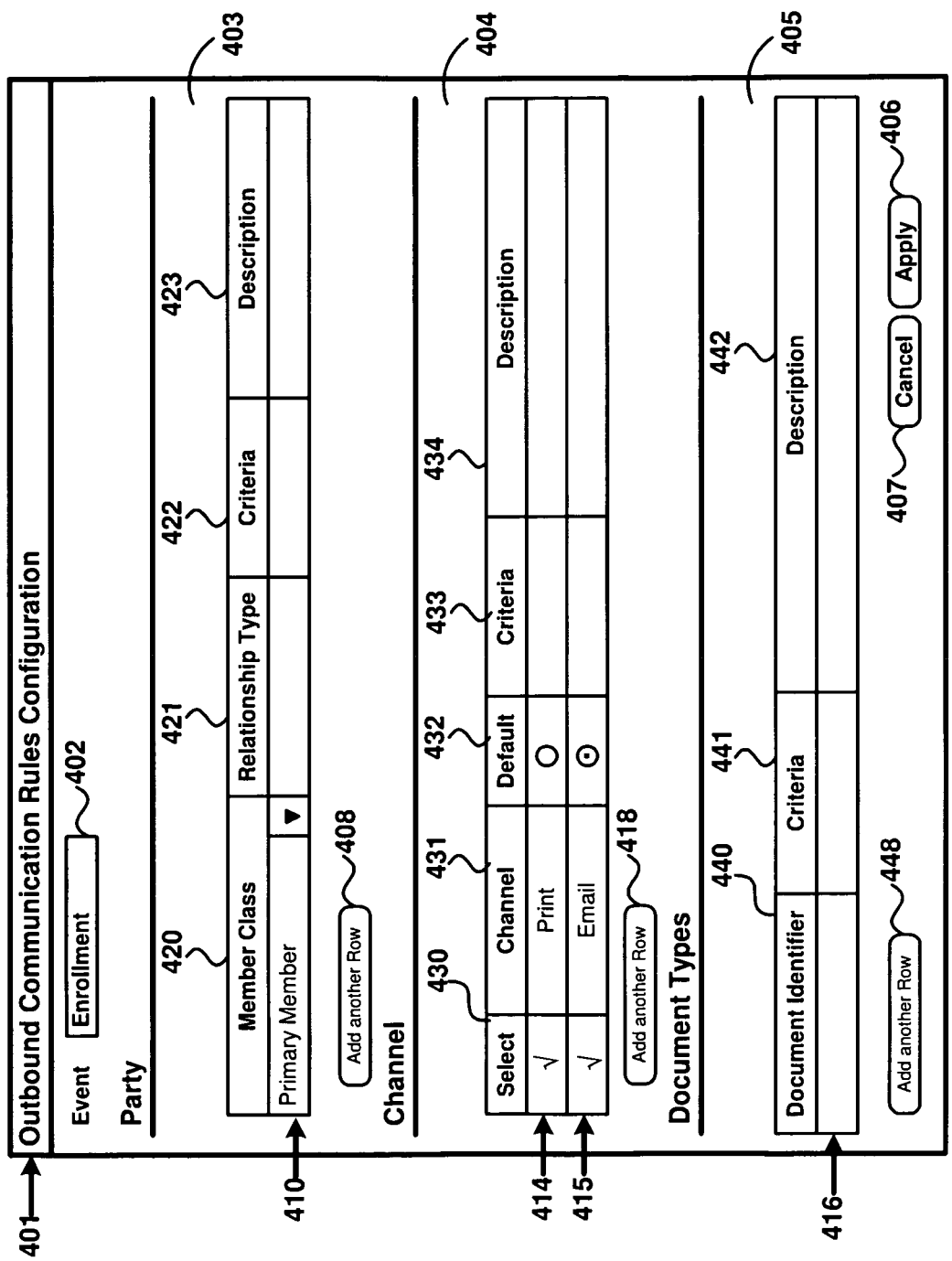
FIG. 4A depicts a graphical user interface using which an administrator may specify configuration rules for controlling communications for an event in one embodiment.

FIG. 4A depicts a graphical user interface using which an administrator may specify configuration rules for controlling communications for an event in one embodiment. The graphical user interface of FIG. 4A is displayed on administrator system 110 by the application framework of the present invention. FIG. 4A is shown containing title 401, text input control 402, portions 403-405, controls 406-408, columns 420-423, 430-433, 440-442 (in corresponding portions 403, 404 and 405) and rows 410, 414-416.

Portion 401 displays the name of activity that is being performed as "Outbound Communication Rules Configuration", indicating that using the provided graphical user interface (GUI), a user/administrator may configure the rules of communication for an event.

Text input control 402 enables an administrator to select an event for which communications are sought to be specified. The administrator is shown having specified Enrollment as the event. For ease of use, the application framework may display a list of options formed from column 333, and the user is assumed to have selected Enrollment as the option. A different web page (graphical user interface) may be displayed for different events, as suited for the corresponding business situation. Thus, the rules specified associated with FIG. 4A may control communications to members who have enrolled recently (e.g., after a prior round of processing of communication to then enrolled members).

Portion 403 enables an administrator to specify rules, which indicate the member classes to which communications are to be sent by virtue of configuration rules specified in FIG. 4A. Accordingly, portion 403 is shown containing text controls entitled "Member Class" (420), "Relationship type" (421), "Criteria" (422) and "Description" (423) in the form of a table.

Selecting control "Add Another Row" 408 displays a new empty row for administrator to add a new rule (for example row 410) for a member class. Values of corresponding columns can be specified as described below.

A value for the member class may either be entered in text control under the column "Member Class" (420) or be selected from a list of values corresponding to various values of class of members. The list (and thus permissible values) is depicted in column 363 of FIG. 3C.

Text control under column "Relationship Type" (421) enables an administrator to specify a corresponding value for the relationship when "Member Relationship" is entered/selected for "Member class" (420). Though not shown above, the various permissible values of relationship may be setup in a table similar to as in FIGS. 3A-3E.

Text Control "Criteria" (422) enables an administrator to indicate the specific criteria for the row. Application framework may instead provide a list of data containing only criteria, which have been setup for a member (in table of FIG. 3A). The administrator may then select desired criteria. Text control "Description" (423) enables an administrator to enter any additional information with respect to the rule contained in corresponding row.

Similarly, Portion 404 contains columns with text controls using which an administrator may configure rules, which are applicable to channels of communication of an event. The channel may include all or some of the channels that are available to the loyalty application (as represented by the data in table of FIG. 3E).

For example, portion 404 is shown containing two rows 414 and 415 with each row indicating the specific channel name, a flag indicating whether a specific channel is a default channel of communications for the event and a criteria for the channel to be used for sending communications on event (being configured). The default channel, if selected, is used if none of the other communication channels match a particular member when sending communications.

Each of rows 414 and 415 is shown containing controls "Select" (430) (indicating that a channel can be used for sending communications on the event), "Channel Name" (431), "Default" (432), "Criteria" (433) and "Description" (434). Each of the columns is described briefly below.

Selecting/Checking control entitled "Select" (430) for a specific row indicates that a rule is being configured for the channel. Similarly, selecting the radio button control under column entitled "Default" (432) indicates that the specific channel of communication is the default channel of communication for the event (in a scenario that no other channel is determined as a suitable/eligible channel based on remaining configured rules).

Text control under column entitled "Channel Name" (431) enables an administrator to select a channel for sending communications on the event. Text Control under column "Criteria" (433) enables an administrator to indicate the specific one of the desired criteria from the list of Column 302 of FIG. 3A. Administrator may select suitable criteria from the list.

Column entitled "Description" (434) contains a text control in which an administrator may enter a value indicating any additional information with respect to the rule contained in the specific row. By selecting the control "Add another Row" (418), an administrator may add channels and corresponding criteria.

Portion 405 enables an administrator to configure rules that are applicable to specific contents of communication as determined by the specific templates/documents. Accordingly, portion 405 is shown containing columns under text controls entitled "Document Identifier" (440), "Criteria" (433) and "Description" (434). Each of the columns is described briefly below.

Text control "Document Identifier" (440) enables an administrator to either indicate or select a specific template from a list of templates (contained in FIG. 3D). Text Control under column "Criteria" (441) enables an administrator to indicate the specific criteria. Application framework may provide a list of criteria applicable to document types using the data contained in table of FIG. 3A and administrator may select suitable criteria from the list. Thus, only the criteria in rows 315-318 only may be made available to the administrator.

Text control under column entitled "Description" (442) enables an administrator to enter a value corresponding to any additional information with respect to the rule contained in the specific row. By selecting control "Add Another Row" (448), an administrator may add any additional rules for document types (in portion 405).

Selecting control entitled "Apply" (406) enables execution of corresponding instructions in application framework to store the configured data representing an event and corresponding rules in configuration storage 160. Selecting control "Cancel" (307) does not save the configuration data.

The description is continued with an illustration of various values which have been provided by an administrator while configuring communication rules for an event using the graphical user interface of FIG. 4A.

Figure 4B:
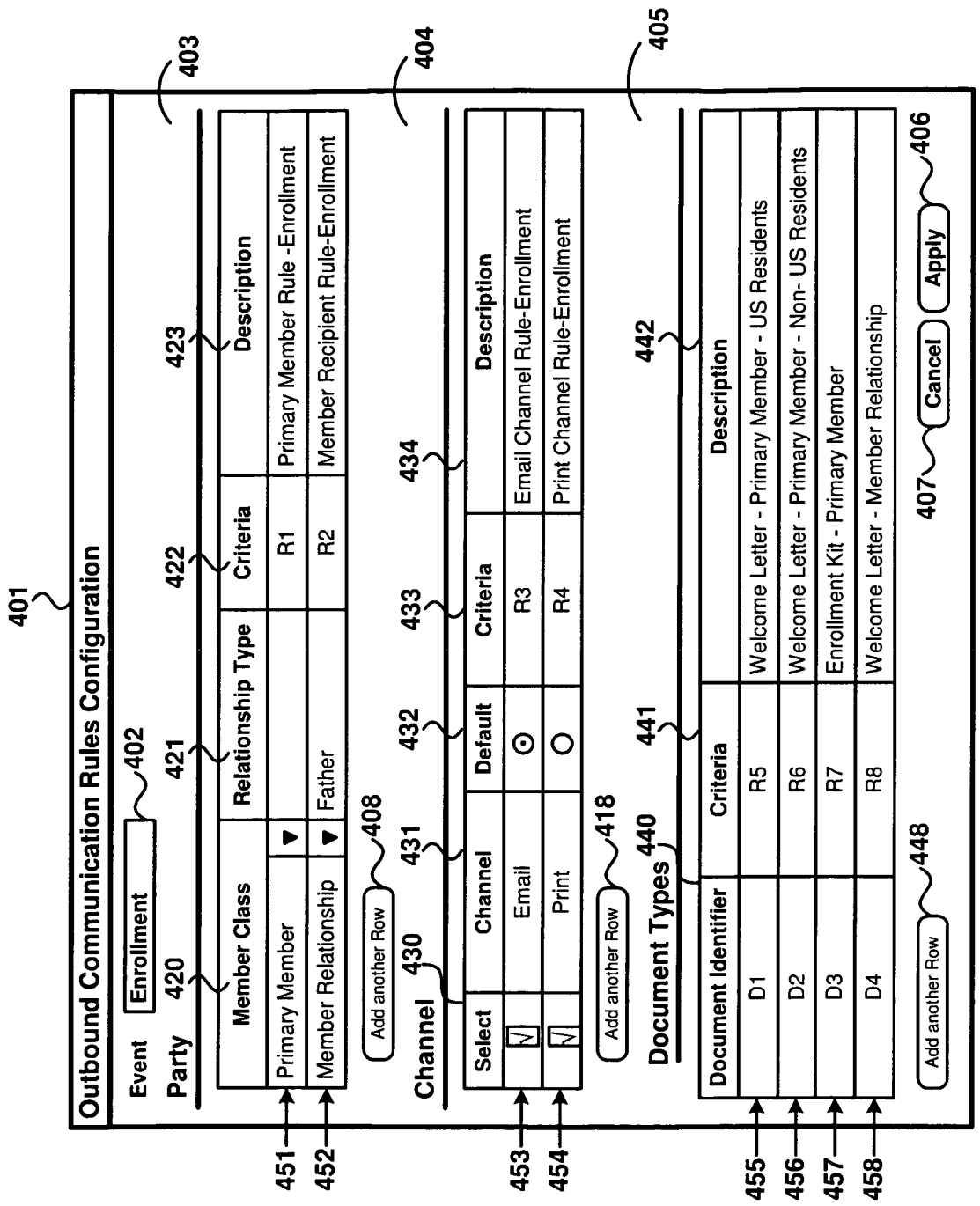
FIG. 4B depicts the various configuration rules specified by a user using the graphical user interface of FIG. 4A in an example scenario.

FIG. 4B depicts the various configuration rules specified by a user using the graphical user interface of FIG. 4A in an example scenario. Similar numbers are used to represent corresponding portions of FIGS. 4A, 4B, and 4C and hence descriptions of such portions are not repeated for conciseness. The description illustrates the specific values representing various rules (in rows 451-458), which are configured for the event "Enrollment" (as indicated by portion 402).

Row 451 indicates that communication is to be sent to the primary member if the member being enrolled (hereafter the enrolling member) has age greater than or equal to 18 (based on criteria R1 of row 311 of FIG. 3A). Row 452 indicates that communication is to be sent to the father of the enrolling member if the enrolling member has age less than 18 (based on criteria R2 of row 312 of FIG. 3A). The manner in which server system 160 may process the rules is described briefly below with reference to FIG. 7 in one embodiment.

Rows 453 and 454 (in portion 404) represent rules an administrator had configured which are applicable to channels of communication for the event "Enrollment" (302). Row 453 indicates Email is to be used for all communication (since there is no condition specified for R3 in row 313). Row 454 indicates print (paper) based communication is to be used if a member is resident in US (or the address so indicates). In effect, the two rules operate to send paper communication to all US residents having corresponding complete address on record, and email communication to the rest (non-US residents).

Similarly, rows 455-458 (in portion 405) represent rules, which are configured by an administrator for contents of communication as determined by the specific document types for the event "Enrollment" (402). Values in rows 455-458 indicate the corresponding criteria as "R5", "R6", "R7", and "R8" applicable to corresponding document types "D1", "D2", "D3", and "D4" respectively. Thus, it should be appreciated that row 455 indicates that the content of communication should be according to template D1 of row 375 for US residents having age greater than or equal to 18. The remaining rows are also similarly described.

The administrator may then select control "Apply" (406) to cause the configured rules to be stored in configuration storage 160 as described below. The description is continued illustrating the manner in rules for the event "Tier Assessment" are specified using the graphical user interface of FIG. 4A.

Figure 4C:
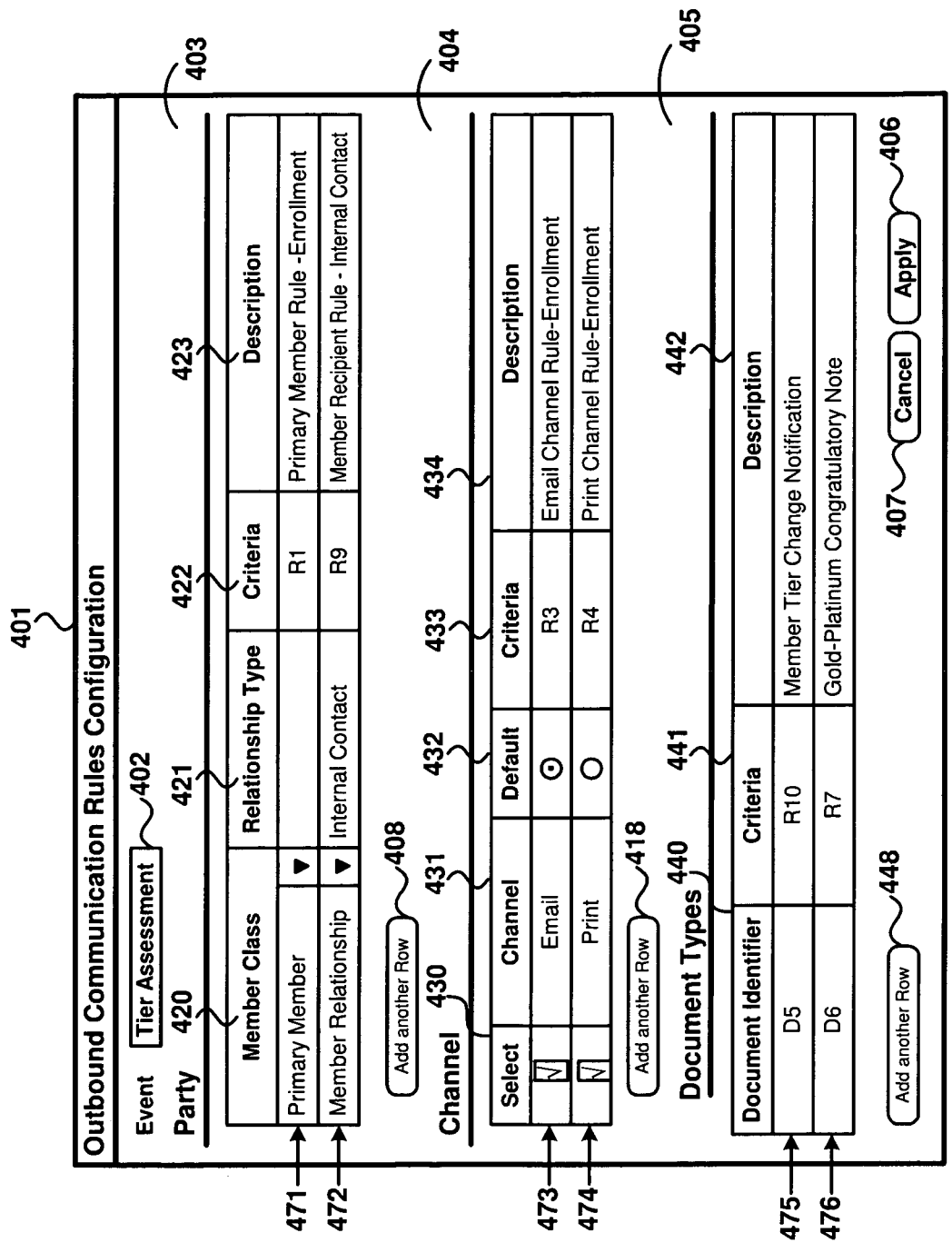
FIG. 4C depicts the various configuration rules specified by a user using the graphical user interface of FIG. 4A in another example scenario.

FIG. 4C depicts the various configuration rules specified by a user using the graphical user interface of FIG. 4A in another example scenario. The description illustrates the specific values representing various rules (in rows 471-476), which are configured for the event "Tier Assessment" (as indicated by portion 402). As described above, a tier assessment event may be triggered when a member is determined to belong to a new tier (for example, based on the number of loyalty points accumulated during a period).

Row 471 indicates that communication is to be sent to the primary member if the member for whom the tier assessment is being performed has age greater than or equal to 18 (based on criteria R1 of row 311 of FIG. 3A). Row 472 indicates that communication is to be sent to an internal contact if the new tier assessed for the member is either "Gold" or "Platinum" (based on criteria R9 of row 319 of FIG. 3A), that is, if the member is determined to belong to the "Gold" or "Platinum" tiers. It may be noted that the rule specified in row 472 determines a communication that is sent to a non-member of the loyalty program.

Rows 473 and 474 are respectively similar to rows 453 and 453 and cause paper communication to be sent to all US residents having corresponding complete address on record, and email communication to the rest (non-US residents) for the event "Tier Assessment".

Rows 475 and 476 represent rules for determining the document types (content) of the communication to be sent for the event "Tier Assessment". In particular, row 476 indicates that the content should be according to template D6 of row 380 for members who have been assessed and upgraded to the new tier "Gold" or "Platinum".

By selecting control "Apply" (406), the configured rules are stored in configuration storage 160. The description is continued illustrating the manner in which the rules specified for the event "Enrollment" in FIG. 4B are stored in one embodiment. Similarly, the rules specified for other events (such as "Tier Assessment" in FIG. 4C) may also be stored as will be apparent to one skilled in the relevant arts by reading the disclosure herein.

6. Stored Configuration Data

FIG. 5 depicts a portion of configuration data in tables contained in configuration storage 160 in one embodiment. It should be appreciated that the table structures, the location of storage of the tables, etc., (of this Figure, as well as others) is merely illustrative and alternative structures, locations, etc., can be chosen without departing from the scope and spirit of several aspects of the present invention, as will be apparent to one skilled in the relevant arts by reading the disclosure provided herein.

Table of FIG. 5 (also referred to as table 5) depicts a portion of data representing rules for configured events as specified by an administrator. As may be appreciated the data in table 5 includes the configuration rules specified using the interface of FIGS. 4A and 4B.

Table 5 contains rows 530-537 and columns 521 "ROWID", 522 "Event Identifier", 523 "Member Class", 524 "Channel", 525 "Document Type", 526 "Member Relationship Type", 527 "Description", 528 "Rule Identifier", and 529 "Flag Default Channel". Each of the columns is described briefly below.

Column 521 "ROWID" specifies an identifier, which uniquely identifies each row representing a rule in table 5B. Column 522 specifies that the row corresponds to a configured event contained in table 5A.

A value in Column 523 "Member class", indicates that a rule represented by the row determines the member (class) to whom communications on the event are configured to be sent. Values in column 523 correspond to the values of specific "Member Class" configured in column 420 of FIG. 4A/4B. The member class can take on any one of the values configured for the member class as shown in table 3C.

Column 524 "Channel" represents various channels of communication which have been configured for an event and hence contain values provided in column 431 by an administrator. Column 525 "Document Type" represents specific template which has been configured for an event as indicated in column 440.

Column 526 "Member Relationship Type" represents corresponding data representing member's relation, when a value of member class selected is "Member Relationship" (420). Accordingly, data in column 526 represent corresponding values which have been provided in column 421. Column 527 "Description" determines any additional information an administrator may specify (in corresponding text controls 423, 434, 442) while configuring specific rules for an event.

Column 528 "Criteria" determines the specific criteria for the row applicable to member class/member, channel and content of communication. The values in column 528 correspond to the values of specific "Criteria" which have been specified in column 422, when a row represents a rule which is applicable to a member class, column 433 when a row represents a rule which is applicable to a channel and column 441 when a row corresponds to a rule applicable to a document type.

Column 529 "Flag Default Channel" represents data indicating that a configured channel is the default channel of communication for the event. Accordingly, values in column 529 corresponds value in column 432 (of the radio button control). A value of "Y" is stored when a configured channel is the default channel of communication for the event.

Each of rows 530-531 depicts corresponding rules for member class, which have been configured for event "Enrollment" (identifier "E10002"). Hence, values in row 530 and 531 represent values indicated by the administrator in corresponding rows 451 and 452 (contained in portion 403).

Each of rows 532-533 represents corresponding rules for channels of communication, which have been configured for the event "Enrollment". Values in rows 532 and 533 represent the specific values indicated by an administrator in corresponding rows 453 and 454 (contained in portion 404).

Similarly, each of rows 534-537 represents corresponding rules configured for content of communication (indicated by corresponding document type) for the event "Enrollment". Values in rows 534-537 represent specific values indicated by an administrator in corresponding rows 455-458 (contained in portion 405) while configuring rules from the graphical user interface of FIGS. 4A/4B.

Criteria (528) in each row represent various conditions that have to be evaluated, as indicated in column 310. Application framework examines conditions for criteria in each row by comparing the member information with the specific condition. Accordingly, the description is continued with an illustration of data representing member information in one embodiment.

7. Member Information

Table of FIG. 6A (also referred to as "table 6A") depicts a portion of data representing various members of a loyalty program in one embodiment. Loyalty application executing in application server 130 may maintain such data in data storage 190 in one embodiment. The loyalty application is deemed to be updating the customer/member information (including addition/removal of members, update of their specific activity, profile, etc.).

Accordingly, Table 6A depicts a portion of data representing the various members of a loyalty program. The table is shown containing rows 651-657 and columns 621-630. Each of the columns of table 6A is described briefly below.

Column 621 "ROWID" specifies an identifier, which uniquely identifies each row in table 6A. Column 622 "Member Identifier" specifies a unique identifier identifying each member while column 623 "Member Relationship Identifier" specifies the member identifier to whom the current member is related.

Column 623 "Member Name", 624 "Member Class", 625 "Member Relationship Type", 626 "Address", 627 "Country", 628 "DOB", and 629 "Member Status" store related information corresponding to each of the members. Thus, values in each of the columns 624-630 represent corresponding data for member information.

It may be appreciated that the combination of member identifier and member relation identifier enables the relationship between members to be captured/stored. For example, rows 653 to 655 specify three members that are related to each other. Row 653 indicates that "Stanley Smith" is the primary member while rows 654 and 655 respectively indicate members having a relationship (father and mother respectively as indicated in column 626) with the primary member (as indicated by the member relationship identifier "M0003" in column 623). Similarly, rows 656 and 657 specify members that are related to each other.

It should be further appreciated that the member information when processed along with the rules needs to identify the specific communication to be sent to specific members using specific channels. Thus, to process the enrollment related configuration rules of above, the membership information may need to indicate the date of enrollment of the member and the system may need to be provided data indicating the specific date of enrollment after which only the enrollment rules are applicable.

Irrespective, sufficient data (including member information) is to be maintained, which facilitates the determination of the specific members who satisfy the occurrence of the specific business situation underlying the corresponding specific events. For example, in the case of enrollment event noted above, it may be necessary to determine the group of members enrolled after a specific date. The application framework and/or the loyalty application together may determine the group of members who are to be considered against each of the events. The table of FIG. 6B depicts the results of such a determination.

Table of FIG. 6B (also referred to as "Table 6B") depicts a portion of data representing various members satisfying the business situation underlying the corresponding specific events and the status of communication. Table 6B is shown containing columns 671-676 and rows 681-683.

Column 671 "ROWID" specifies an identifier, which uniquely identifies each row in table 6B. Column 672 "Member Identifier" indicates the specific member corresponding to whom the event identified to have occurred, while column 673 "Event Identifier" indicates the specific event that is identified. Columns 6674 and 675 indicate the start date and the end date between which the occurrence of the event is to be processed, with empty values indicating that the event may be processed at any convenient date/time.

Column 676 "Communication Status" indicates a status of processing of communication on the event occurring to the corresponding member. The communication status may be updated with appropriate values (such as "Pending", "Sent", "Acknowledged", etc.) by the application framework while processing communication on an event.

Each row indicates the identification of the occurrence of an event for a corresponding member. Thus, row 681 indicates the occurrence of the event "Enrollment" (corresponding to the identifier "E10002") for the member named "Joseph Ben" (corresponding to the identifier "M0001") which has to be processed (the value "Pending") at any convenient date/time (the empty values in columns 674 and 675). Similarly, row 682 corresponds to the event "Enrollment" for the member named "Stanley Smith".

Row 683 may correspond to the identification of the event "Birthday" (assuming that table 3B is configured accordingly for the event identifier "E10008") for the member named "Gabriel Grant" having a relationship "Spouse" with the primary member/customer named "William Grant".

The description is continued with an illustration of the manner in which application framework may examine rules configured by an administrator for an event and may determine specific members, content and channel of communications in one embodiment.

8. Examining Configuration Rules and Sending Communication

Figure 7:
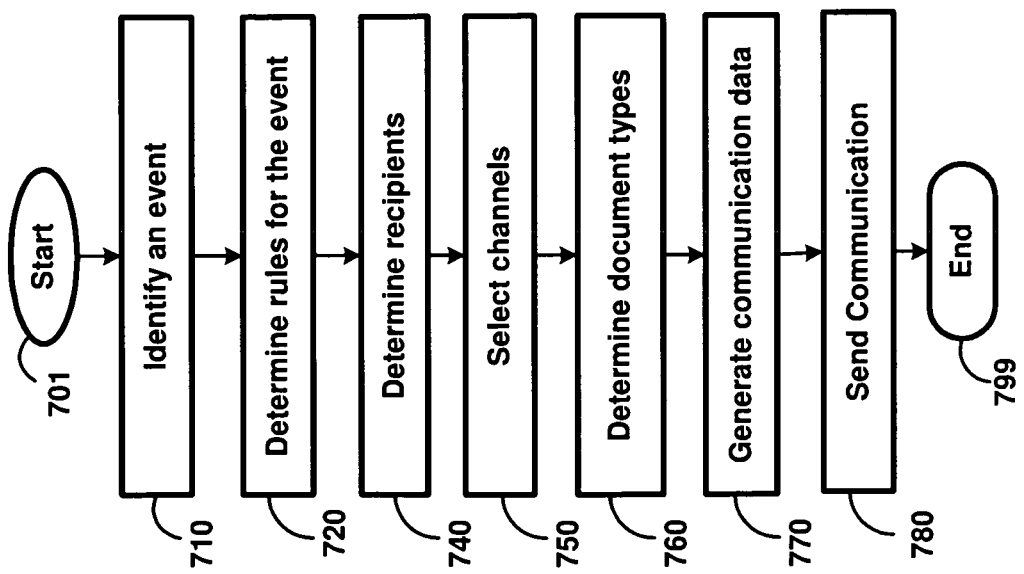
FIG. 7 is a flowchart illustrating the manner in which an application framework examines rules of an event and determines recipients, channel, and content of communication according to an aspect of the present invention.

FIG. 7 is a flowchart illustrating the manner in which application framework executing on server cluster 150 examines rules of an event and determines recipients, channel, and content of communication according to an aspect of the present invention. The flow chart begins in step 701, in which control immediately passes to step 710.

In step 710, application framework identifies events for which communications are to be sent. Application framework may perform such identification based on specific durations when communication on an event need to be processed (for example, festival offers in a particular set of days around a festival) or input criteria which can be provided by an administrator for sending communications such as "End date" (column 665).

In step 720, application framework determines configured rules for the event. Application framework may determine from data contained in table 5, rules associated with the identified event(s) of step 710. For example, rows 530-537 in table 5 indicate configured rules for the event "Enrollment".

In step 740, application framework determines recipients of communication for the identified event. Application framework determines members of an event (from table 6A) and rules configured for the event applicable to member class from table 5. Conditions configured for each rule is accessed from table 3A and compared with specific member information to determine the recipients of communication.

For example, when processing the event "Enrollment" for the member "Joseph Ben" having member identifier "M0001" (as indicated by row 681), application framework first determines that the rules in rows 530 and 531 of table 5 are to be used to determine the recipients.

Accordingly, the condition R1 "Member's Age>=18 years" specified in the rule in row 530 is first processed in the context of the member class "Primary Member", which in the current scenario is the enrolling member "Joseph Ben". The primary member "Joseph Ben" is determined to be a recipient since the enrolling member's age is greater than 18 (as indicated by the DOB "17 Jan. 1963" in row 651 corresponding to the member identifier "M0001").

The rule in row 531 is then processed for "Member Relationship" member class. Since the member information of table 6A does not indicate any rows having the member relationship identifier (in column 623) as the enrolling member identifier "M0001", it is determined that there exists no relationship for the member "Joseph Ben". Accordingly, the rule is determined to be not satisfied and only the enrolling member "Joseph Ben" is determined as a recipient of the communications.

It may be appreciated that when processing the "Enrollment" event for the member "Stanley Smith" having member identifier "M0003" (as indicated by row 682), the rule in row 530 is determined to be not satisfied since the condition R1 of the enrolling member's age being greater than or equal to 18 is not satisfied (as indicated by the DOB "1 Dec. 1993" in row 653 corresponding to the member identifier "M0003").

While processing the rule in row 531, rows 654 and 655 are identified to have relationship with the enrolling member since the corresponding member relationship identifier of the rows 654 and 655 indicate the enrolling member identifier "M0003". The member relationship type "Father" and the condition R2 "Member's Age<18 years" are evaluated in the context of the information contained in rows 654 and 655. Accordingly, the member "Terry Smith" is determined as the recipient for communication as satisfying both the relationship type and the condition.

Similarly, the recipients for communication are determined based on the rules configured by a user/administrator. It may be appreciated that the application framework may determine multiple recipients for the same event based on the manner of configuration of the rules. Steps 750, 760 and 770 described below are then performed for each of the determined recipients.

In one embodiment, the rules are evaluated to determine a recipient to whom communication is to be sent in step 740. Steps 750, 760 and 770 are then performed to select the channel, to determine the document type and to generate the communication data corresponding to the determined recipient. The steps 740, 750, 760 and 770 are then repeated until all the recipients are determined or until all the rules are evaluated.

In step 750, application framework selects channels of communication for the identified event and the determined recipients. Application framework first determines the rules for configuring the selection of the channels corresponding to the identified event, for example, the rules/rows in table 5 having the identifier of the identified event in the "Event Identifier" column and a value in the "Channel" column. The corresponding conditions in table 5 are examined to determine specific channels of communication. A default channel of communication may be used in case no channel is selected based on the rules.

For example, for the event "Enrollment" of rows 681 and 682, application framework may first determine that the rules in rows 532-533 are to be used for selecting the channels of communication. The conditions associated with the rules are then evaluated to select the channels of communication for each of the recipients determined in step 740.

The non-default rules are first evaluated. Thus, according to the rule in row 533, the "Print" channel is selected since the country of both the enrolling members with identifiers "M0001" and "M0003" (corresponding to rows 681 and 682) is indicated to be "USA" in table 6A, thus satisfying the condition R4. The default rule is selected only if a channel is not selected by the evaluation of the non-default rules.

In step 760, application framework determines document types/templates representing the content of communication to be sent for the identified event and the determined recipients. Application framework first determines rules corresponding to document types, for example, the rules/rows in table 5 having the identifier of the identified event in the "Event Identifier" column and a value in the "Document Type" column. The corresponding conditions in table 5 are examined to determine specific document type/template to be used for the identified event. Though not shown, a default template/content may be specified if none of the rules when examined determine a specific content of communication for an event.

For example, for the event "Enrollment" of rows 681 and 682, application framework may first determine that the rules in rows 534-537 are to be used for determining the content of the communication. The condition associated with each of the rules is then evaluated to determine the document types corresponding to each of the recipients determined in step 740.

Thus, when the enrolling member is "Joseph Ben" having member identifier "M0001" (row 681), the application framework determines that only the conditions R5 and R7 are satisfied in the context of the information of the enrolling member. Accordingly, only the document types D1 "Welcome Letter-Primary Member-US Residents" and D3 "Enrollment Kit-Primary Member" are determined as the content type of the communication.

Application framework then determines the specific content corresponding to the determined document types based on the data in table 3D. Thus, for the member "Joseph Ben", the content in the files "file::/templates/us/welcome.wpd" and "file::/templates/all/enroll.zip" (corresponding to document types D1 and D3) may be determined to be the content of the communication to be sent the member.

Similarly, when the enrollment event for the member "Stanley Smith" (row 682) is processed, the content of the files "file::/templates/all/enroll.zip" and "file::/templates/all/relation.wpd" (corresponding to document types D3 "Enrollment Kit-Primary Member" and D4 "Welcome Letter—Member Relationship") is determined as the content of the communication to be sent to the member "Stanley Smith".

In step 770, application framework generates communication data based on determined recipients, selected channels, and the determined content of communication corresponding to the identified event.

For example, for the event "Enrollment" for the member "Joseph Ben" (row 681), a printed copy of the documents "Welcome Letter-Primary Member-US Residents", and "Enrollment Kit-Primary Member" for the recipient "Joseph Ben" is generated. In general, the communication data is generated such that the determined content is capable of being sent on the selected channel.

In step 780, communication is sent to the determined recipients according to the contents determined using the selected channels of communication for the identified event. Application framework may further store/update corresponding status of communication in column 676 of table 6B.

For example for the event "Enrollment" for the member "Joseph Ben" (row 681) the generated contents (of step 770) is sent to the recipient "Joseph Ben" using the "Print" channel. The value of communication status (column 676) of row 681 may then be updated to indicate completion of communication on the event.

It should be further appreciated that the features described above can be implemented in various embodiments as a desired combination of one or more of hardware, software, and firmware. The description is continued with respect to one embodiment in which various features are operative when software instructions are executed.

9. Digital Processing System

Figure 8:
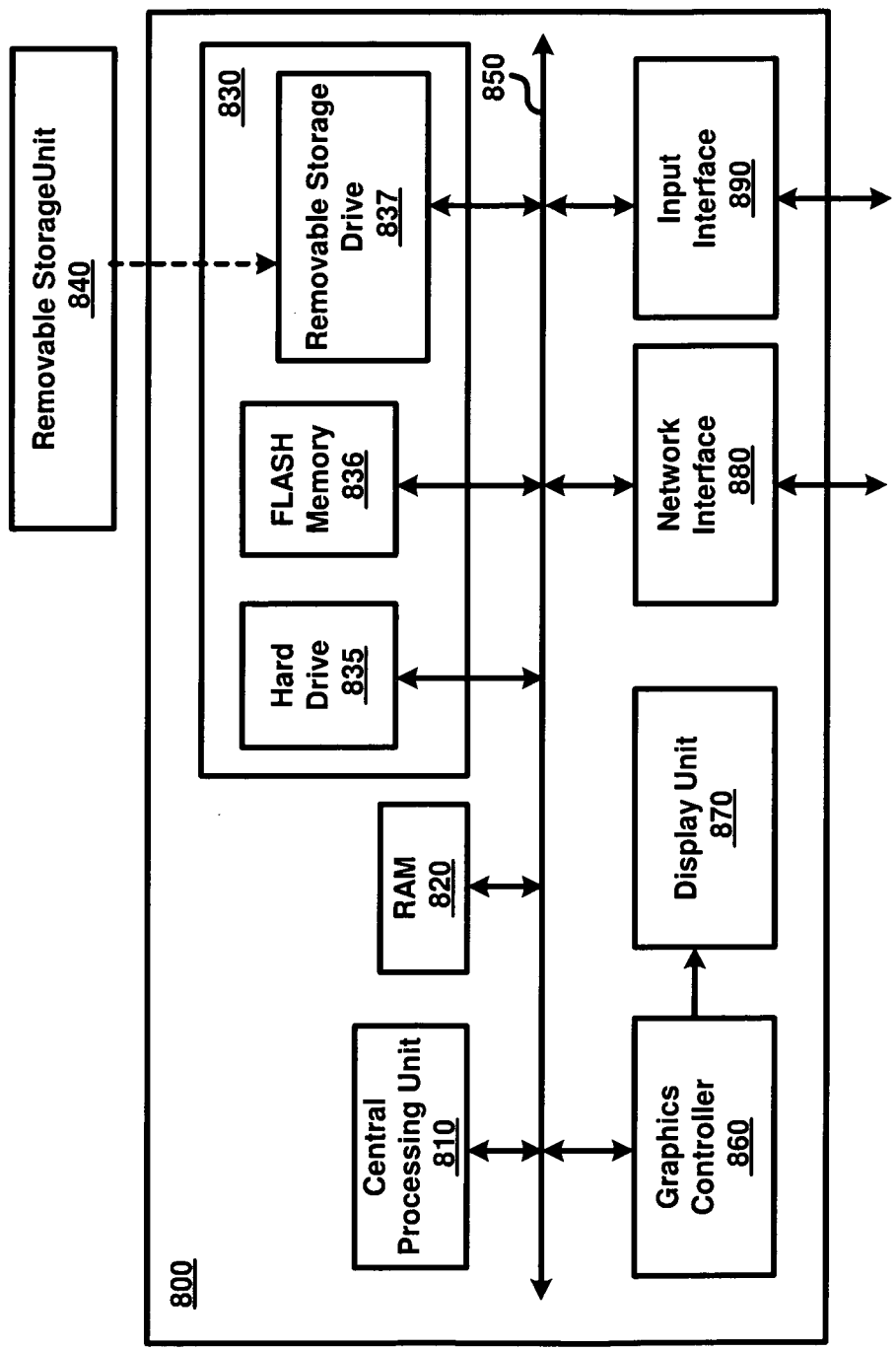
FIG. 8 is a block diagram illustrating the details of a digital processing system in which various aspects of the present invention are operative by execution of appropriate software instructions.

FIG. 8 is a block diagram illustrating the details of digital processing system 800 in which various aspects of the present invention are operative by execution of appropriate software instructions. Digital processing system 800 may correspond to any system (such as server cluster 150) executing the application framework.

Digital processing system 800 may contain one or more processors (such as a central processing unit (CPU) 810), random access memory (RAM) 820, secondary memory 830, graphics controller 850, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present invention. CPU 810 may contain multiple processing units, with each processing unit potentially being designed for a specific task. Alternatively, CPU 810 may contain only a single general-purpose processing unit. RAM 820 may receive instructions from secondary memory 830 using communication path 850.

Graphics controller 850 generates display signals (e.g., in RGB format) to display unit 870 based on data/instructions received from CPU 810. Display unit 870 contains a display screen to display the images defined by the display signals (such as the portions of user interfaces depicted in FIGS. 4A, 4B, and 4C). Input interface 890 may correspond to a keyboard and a pointing device (e.g., touch-pad, mouse) and may be used to provide the inputs of FIGS. 4B and 4C.

Network interface 880 provides connectivity to a network (e.g., using Internet Protocol), and may be used to communicate with other connected systems (such as administrator systems 110, configuration storage 160 or application server 130) of FIG. 1.

Secondary memory 830 may contain hard drive 835, flash memory 835, and removable storage drive 837. Secondary memory 830 may store the data (e.g., portions of data depicted in FIGS. 3A-3E, 5, 6A and 6B) and software instructions, which enable digital processing system 800 to provide several features in accordance with the present invention.

Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present invention described above.

10. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of facilitating administrators to control communications to corresponding a plurality of members of loyalty programs, said method comprising:

maintaining a member information containing the details of each of said a plurality of members of a loyalty program;

enabling an administrator of said loyalty program to configure a plurality of events and a respective set of rules associated with each of said plurality of events, wherein each of said plurality of events represents a potential interaction between said loyalty program and users of said loyalty program, wherein a plurality of rules corresponding to an event are received from said administrator, each rule specifying a corresponding criteria in the form of a set of conditions, said event being one of said plurality of events in administration of said loyalty program, wherein the set of conditions for the corresponding criteria specified in a first set of rules when examined against said member information of each member identifies whether the member is to be sent a communication in administration of said loyalty program, wherein the set of conditions for the corresponding criteria in a second set of rules when examined against said member information identifies which ones of a plurality of contents is to be sent as the corresponding communication for each of the members identified based on said first set of rules in administration of said loyalty program, wherein the set of conditions for the corresponding criteria in a third set of rules when examined against said member information of said loyalty program identifies which one of a plurality of channels is to be used for sending each communication in administration of said loyalty program, wherein said first set of rules, said second set of rules and said third set of rules are separate sets and contained in said plurality of rules for said event;

storing said plurality of rules in a non-volatile memory;

identifying a single occurrence of said event of said loyalty program configured by said administrator;

examining the corresponding criteria specified in each of said plurality of rules against said member information of each of said plurality of members, wherein said examining of said first set of rules determines that a first member and a second member are to be sent respective communications, wherein said examining of said second set of rules determines that a first content is to be sent to said first member and a second content is to be sent to said second member, wherein said examining of said third set of rules determines that a first channel is to be used to send said first content to said first member and that a second channel is to be used to send said second content to said second member, wherein said first content and said second content are contained in said plurality of contents, said first member and said second member are contained in said plurality of members and said first channel and said second channel are contained in said plurality of channels; and sending said first content to said first member using said first channel and said second content to said second member using said second channel based on said examining in response to an input that said event has occurred, wherein said examining and said sending are performed in response to said identifying of said single occurrence of said event, wherein said administrator controls the respective specific contents to be sent to the corresponding member based on said second set of rules and also controls the respective specific channels using which respective communications are sent based on said third set of rules for each of said plurality of events of said loyalty program, wherein different administrators of different loyalty programs are enabled to configure corresponding rules to control the events, and the specific corresponding members to receive communications for each event, the content of each communication and the channel of communication, wherein said event comprises one of assessment, enrolment, voucher redemption, loyalty units purchase, and statement request, wherein said administrator specifies all of said plurality of rules for said event in a single user interface displayed to said administrator on a display screen.

2. The method of claim 1, wherein said member information specifies that a third member is related to a fourth member by a relationship, said third member and said fourth member being contained in said plurality of members, wherein said plurality of rules includes a third rule and a fourth rule associated with said third member, wherein said third rule is contained in said first set of rules and specifies a criteria which matches the member information of said third member, wherein said fourth rule indicates that communication is to be sent to said fourth member when said single occurrence of said event is identified occurring in relation to said third member, wherein said sending sends a fourth content to said fourth member as originating from an organization corresponding to said loyalty program in response to said single occurrence of said event occurring in relation to said third member and said member information specifying that said third member is related to said fourth member.

3. The method of claim 2, wherein said fourth rule indicates that said fourth member is to be sent communication only upon the member information corresponding to said third member satisfying a condition specified as the corresponding criteria in said fourth rule.

4. The method of claim 3, wherein said fourth member is a parent and said third member is a child of said parent, and wherein said condition comprises checking the age of said child.

5. The method of claim 3, wherein said fourth member is a contact person in a business entity associated with said loyalty program and said condition comprises a change of level of said third member based on the number of loyalty units accumulated by said third member in a period.

6. The method of claim 1, wherein one of said third set of rules indicates that one of said plurality of channels is a default channel, wherein said default channel is determined to be said corresponding channel if the member information of the corresponding member contained in said set of members does not satisfy the corresponding criteria of the remaining ones of said third set of rules other than said one of said third set of rules.

7. The method of claim 6, wherein the corresponding criteria for one of said second set of rules is based on a type of content, and wherein the corresponding criteria for one of said third set of rules is based on a type of channel.

8. The method of claim 1, wherein said member information further contains the details of a recipient who is not a member of said loyalty program, wherein said administrator is enabled to configure rules for identifying which of said plurality of contents is to be sent to said recipient and which of said plurality of channels is to be used for said sending to said recipient, wherein said examining said plurality of rules and said member information determines that a fifth content is to be sent to said recipient using a fifth channel, said fifth content being contained in said plurality of content and said fifth channel being contained in said plurality of channels, wherein said sending sends said fifth content to said recipient using said fifth channel.

9. The method of claim 1, wherein each of said plurality of contents represents a corresponding document stored as a file, and wherein each of said first content and said second content respectively represents a first document stored as a first file and a second document stored as a second file, wherein said sending sends said first document to said first member and said second document to said second member.

10. A machine readable medium storing one or more sequences of instructions causing a system administrators of loyalty programs to control communications to a plurality of members of loyalty programs using a corresponding system, wherein execution of said one or more sequences of instructions by one or more processors contained in said system causes said system to perform the actions of:

maintaining a member information containing the details of each of said plurality of members of a loyalty program;

enabling an administrator of said loyalty program to configure a plurality of events, and a respective set of rules associated with each of said plurality of events, wherein said plurality of events are potential events that can occur during administration of said loyalty program, wherein a plurality of rules corresponding to an event are received from said administrator, each rule specifying a corresponding criteria in the form of a set of conditions, said event being one of said plurality of events in administration of said loyalty program, wherein the set of conditions for the corresponding criteria specified in a first set of rules when examined against said member information of each member identifies whether the member is to be sent a communication in administration of said loyalty program, wherein the set of conditions for the corresponding criteria in a second set of rules when examined against said member information identifies which ones of a plurality of contents is to be sent as the corresponding communication for each of the members identified based on said first set of rules in administration of said loyalty program, wherein the set of conditions for the corresponding criteria in a third set of rules when examined against said member information of said loyalty program identifies which one of a plurality of channels is to be used for sending each communication in administration of said loyalty program, wherein said first set of rules, said second set of rules and said third set of rules are separate sets and contained in said plurality of rules for said event;

storing said plurality of rules in a non-volatile memory;

identifying a single occurrence of said event of said loyalty program configured by said administrator;

examining the corresponding criteria specified in each of said plurality of rules against said member information of each of said plurality of members, wherein said examining of said first set of rules determines that a first member and a second member are to be sent respective communications, wherein said examining of said second set of rules determines that a first content is to be sent to said first member and a second content is to be sent to said second member, wherein said examining of said third set of rules determines that a first channel is to be used to send said first content to said first member and that a second channel is to be used to send said second content to said second member, wherein said first content and said second content are contained in said plurality of contents, said first member and said second member are contained in said plurality of members and said first channel and said second channel are contained in said plurality of channels; and sending said first content to said first member using said first channel and said second content to said second member using said second channel based on said examining in response to an input that said event has occurred, wherein said examining and said sending are performed in response to said identifying of said single occurrence of said event, wherein said administrator controls the respective specific contents to be sent to the corresponding member based on said second set of rules and also controls the respective specific channels using which respective communications are sent based on said third set of rules for each of said plurality of events of said loyalty program, wherein different administrators of different loyalty programs are enabled to configure corresponding rules to control the events, and the specific corresponding members to receive communications for each event, the content of each communication and the channel of communication, wherein said event comprises one of assessment, enrolment, voucher redemption, loyalty units purchase, and statement request, wherein said administrator specifies all of said plurality of rules for said event in a single user interface displayed to said administrator on a display screen.

11. The machine readable medium of claim 10, wherein said member information specifies that a third member is related to a fourth member by a relationship, said third member and said fourth member being contained in said plurality of members, wherein said plurality of rules includes a third rule and a fourth rule associated with said third member, wherein said third rule is contained in said first set of rules and specifies a criteria which matches the member information of said third member, wherein said fourth rule indicates that communication is to be sent to said fourth member when said single occurrence of said event is identified occurring in relation to said third member and the member information corresponding to said third member satisfies a condition specified as the corresponding criteria in said fourth rule, wherein said sending sends a fourth content to said fourth member in response to said single occurrence of said event occurring in relation to said third member and said member information corresponding to said third member satisfying said condition.

12. A computing system comprising:

an application server to maintain a member information containing the details of each of a plurality of members of a loyalty program;

an administrator system to enable an administrator of said loyalty program to configure a plurality of events, and a respective set of rules associated with each of said plurality of events, wherein said plurality of events are potential events that can occur during administration of said loyalty program, wherein a plurality of rules corresponding to an event are received from said administrator, each rule specifying a corresponding criteria in the form of a set of conditions, said event being one of said plurality of events in administration of said loyalty program, wherein the set of conditions for the corresponding criteria specified in a first set of rules when examined against said member information of each member identifies whether the member is to be sent a communication in administration of said loyalty program, wherein the set of conditions for the corresponding criteria in a second set of rules when examined against said member information identifies which ones of a plurality of contents is to be sent as the corresponding communication for each of the members identified based on said first set of rules in administration of said loyalty program, wherein the set of conditions for the corresponding criteria in a third set of rules when examined against said member information of said loyalty program identifies which one of a plurality of channels is to be used for sending each communication in administration of said loyalty program, wherein said first set of rules, said second set of rules and said third set of rules are separate sets and contained in said plurality of rules for said event;

a configuration storage to store said plurality of rules; and a server cluster operable to:
  identify a single occurrence of said event of said loyalty program configured by said administrator;
  examine the corresponding criteria specified in each of said plurality of rules configured by said administrator against said member information of each of said plurality of members,
  wherein said examining of said first set of rules determines that a first member and a second member are to be sent respective communications,
  wherein said examining of said second set of rules determines that a first content is to be sent to said first member and a second content is to be sent to said second member,
  wherein said examining of said third set of rules determines that a first channel is to be used to send said first content to said first member and that a second channel is to be used to send said second content to said second member,
  wherein said first content and said second content are contained in said plurality of contents, said first member and said second member are contained in said plurality of members and said first channel and said second channel are contained in said plurality of channels; and
  send said first content to said first member using said first channel and said second content to said second member using said second channel based on said examining in response to an input that said event has occurred,
wherein said examining and said sending are performed in response to said identifying of said single occurrence of said event,
wherein said administrator controls the respective specific contents to be sent to the corresponding member based on said second set of rules and also controls the respective specific channels using which respective communications are sent based on said third set of rules for each of said plurality of events of said loyalty program,
wherein different administrators of different loyalty programs are enabled to configure corresponding rules to control the events, and the specific corresponding members to receive communications for each event, the content of each communication and the channel of communication, wherein said event comprises one of assessment, enrolment, voucher redemption, loyalty units purchase, and statement request, wherein said administrator specifies all of said plurality of rules for said event in a single user interface displayed to said administrator on a display screen.

13. The computing system of claim 12, wherein said member information specifies that a third member is related to a fourth member by a relationship, said third member and said fourth member being contained in said plurality of members, wherein said plurality of rules includes a third rule and a fourth rule associated with said third member, wherein said third rule is contained in said first set of rules and specifies a criteria which matches the member information of said third member, wherein said fourth rule indicates that communication is to be sent to said fourth member when said single occurrence of said event is identified occurring in relation to said third member and the member information corresponding to said third member satisfies a condition specified as the corresponding criteria in said fourth rule, wherein server cluster sends a fourth content to said fourth member in response to said single occurrence of said event occurring in relation to said third member and the member information corresponding to said third member satisfying said condition.

* * * * *

UNITED STATES PATENT AND TRADEMARK OFFICE
CERTIFICATE OF CORRECTION

| | | |
|---|---|---|
| PATENT NO. | : 8,543,616 B2 | Page 1 of 1 |
| APPLICATION NO. | : 12/138447 | |
| DATED | : September 24, 2013 | |
| INVENTOR(S) | : Machiraju | |

It is certified that error appears in the above-identified patent and that said Letters Patent is hereby corrected as shown below:

On Title page, column 2, under Other Publications, line 1, delete "Marketting" and insert -- Marketing --, therefor.

On Title page 2, column 2, under Other Publications, line 1, delete "Marketting" and insert -- Marketing --, therefor.

In the Specification

In column 5, line 38, delete "sever" and insert -- server --, therefor.

Signed and Sealed this
Eighteenth Day of March, 2014

Michelle K. Lee
*Deputy Director of the United States Patent and Trademark Office*